United States Patent
Chang

(10) Patent No.: US 9,016,856 B2
(45) Date of Patent: Apr. 28, 2015

(54) SCREWLESS EYEGLASSES

(71) Applicant: Action Eyewear Corp., Taipei (TW)

(72) Inventor: Tuo-Liu Chang, Taipei (TW)

(73) Assignee: Action Eyewear Corp., Taipei (TW)

(*) Notice: Subject to any disclaimer, the term of this patent is extended or adjusted under 35 U.S.C. 154(b) by 24 days.

(21) Appl. No.: 13/947,527

(22) Filed: Jul. 22, 2013

(65) Prior Publication Data

US 2014/0247421 A1    Sep. 4, 2014

(30) Foreign Application Priority Data

Mar. 1, 2013 (TW) .............................. 102107352 A

(51) Int. Cl.
*G02C 5/22* (2006.01)
*G02C 5/14* (2006.01)

(52) U.S. Cl.
CPC ............... *G02C 5/2254* (2013.01); *G02C 5/14* (2013.01); *G02C 5/146* (2013.01); *G02C 5/2209* (2013.01); *G02C 2200/16* (2013.01); *G02C 2200/24* (2013.01)

(58) Field of Classification Search
CPC ................................... G02C 5/14; G02C 5/146
USPC .......................... 351/111, 116, 119, 121, 140
See application file for complete search history.

(56) References Cited

U.S. PATENT DOCUMENTS

2010/0118257 A1* 5/2010 Brousseau et al. ............. 351/52
2011/0317123 A1* 12/2011 Li .................................. 351/140

FOREIGN PATENT DOCUMENTS

TW          M308418          3/2007

* cited by examiner

*Primary Examiner* — Suchin Parihar
*Assistant Examiner* — William R Alexander
(74) *Attorney, Agent, or Firm* — Li & Cai Intellectual Property (USA) Office

(57) ABSTRACT

A temple assembly of a pair of eyeglasses is coupled to a frame body without screws. The temple assembly of eyeglasses includes a first connecting member and a second connecting member. The first connecting member includes a lever arm portion and a latching portion extended by the lever arm portion along the direction distal from said frame body. The second connecting member includes an elastic portion and an engaging portion extended by the elastic portion along the direction distal from the frame body; wherein the latching portion detachably coupled to the engaging portion, the elastic portion approached elastically to the lever arm portion. Thereby, an end piece of the frame body is rotatably coupled between the lever arm portion and the elastic portion.

11 Claims, 9 Drawing Sheets

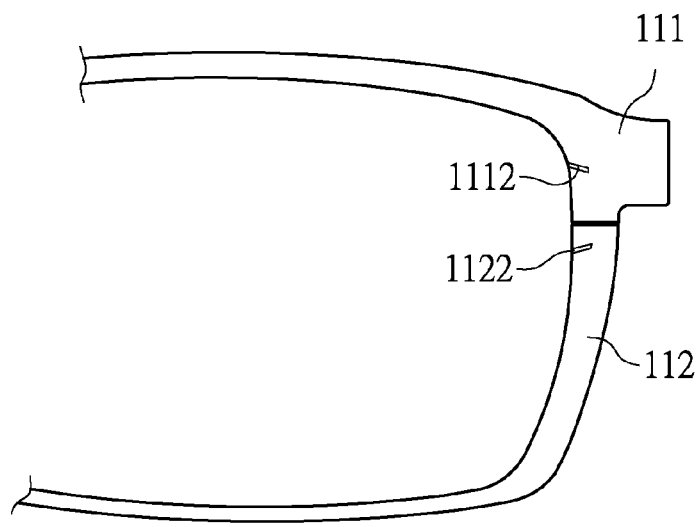
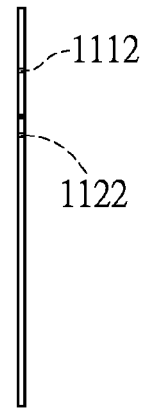
FIG.9A  FIG.9B
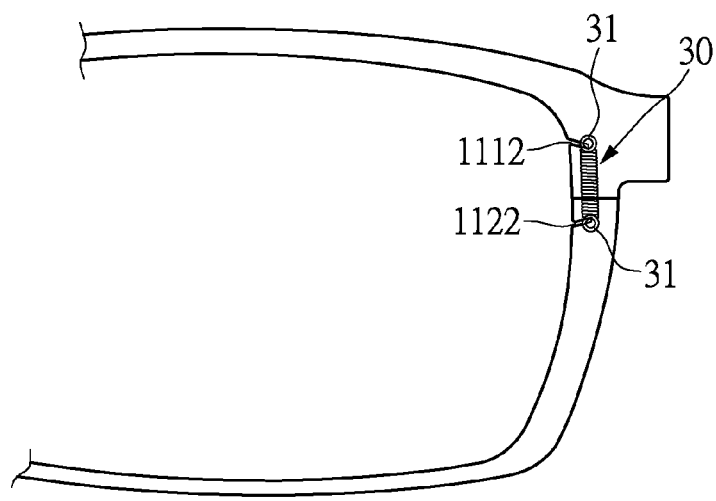
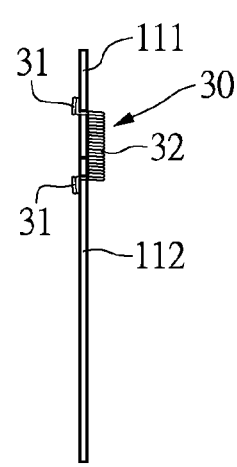
FIG.10A  FIG.10B

SCREWLESS EYEGLASSES

BACKGROUND OF THE INVENTION

1. Field of the Invention

The instant disclosure relates to a pair of eyeglasses; in particular, to a pair of eyeglasses without the use of screws for assembly.

2. Description of Related Art

Eyeglasses are common accessories that have an irreplaceable existence whether for eyesight compensation or aesthetic accessorizing.

Majority of the traditional eyeglasses uses screws or soldering to assemble a rim with temples. However, screw assembled frames are inconvenient and tend to rust and loosen, whereas soldering assembled frames are prone to fracture and are not environmentally friendly.

In order to address the above issues from the prior art, Taiwanese patent with publication no. M308418 provides a pair of eyeglasses having temples and connectors, in which two lateral sides of the eyeglasses each has portions defining a slit. Two sidewalls of the connectors are fitted to the slits, whereas the temples and the sidewalls are pivotally coupled to each other. Although the aforementioned structural configuration is screwless, the pivotal coupling between the connectors and the temples is often prone to shifting movements, which often requires adjustments.

To address the above issues, the inventor strives via associated experience and research to present the instant disclosure, which can effectively improve the limitation described above.

SUMMARY OF THE INVENTION

The object of the instant disclosure is to provide a pair of screwless eyeglasses having a rim and temple assembly associated. Through the temple assembly formed by mutually engaging a first connecting member and a second connecting member and the elastic properties of the materials of the two members, the two members are coupled to two lateral sides of the rim.

In order to achieve the aforementioned objects, according to an embodiment of the instant disclosure, a temple assembly for a pair of screwless eyeglasses is provided and coupled to a frame body. The temple assembly includes a first connecting member and second connecting member. The first connecting member includes a lever arm portion and a latching portion extended from the lever arm portion distal from the frame body. The second connecting member includes an elastic portion and an engaging portion extended from the elastic portion distal from the frame body. The latching portion can detachably latch onto the engaging portion. The elastic portion is pushed towards the lever arm portion through the engaging portion as a fulcrum. Thus, one end of the frame body can rotatably clamp between the elastic portion and the lever arm portion.

The instant disclosure also provides a pair of screwless eyeglasses. The eyeglasses include a frame body and two temple assemblies. The frame body includes a rim and a pair of end pieces extending from two lateral sides of the rim. The two temple assemblies respectively connect to two lateral sides of the frame body. Each temple assembly includes a first connecting member and a second connecting member. The first connecting member includes a lever arm portion and a latching portion extended from the lever arm portion distal from the frame body. The second connecting member includes an elastic portion and an engaging portion extended from the elastic portion distal from the frame body. The latching portion can detachably latch onto the engaging portion. The elastic portion is pushed towards the lever arm portion through the engaging portion as a fulcrum. Thus, one end of the frame body can rotatably clamp between the elastic portion and the lever arm portion.

In order to further understand the instant disclosure, the following embodiments and illustrations are provided. However, the detailed description and drawings are merely illustrative of the disclosure, rather than limiting the scope being defined by the appended claims and equivalents thereof.

BRIEF DESCRIPTION OF THE DRAWINGS

FIG. 9A is a front view illustrating a rim of the pair of screwless eyeglasses in accordance with the instant disclosure;

FIG. 9B is a side view illustrating the rim of the pair of screwless eyeglasses in accordance with the instant disclosure;

FIG. 10A is another front view illustrating a rim of the pair of screwless eyeglasses in accordance with the instant disclosure; and FIG. 10B is another side view illustrating the rim of the pair of screwless eyeglasses in accordance with the instant disclosure.

DETAILED DESCRIPTION OF THE PREFERRED EMBODIMENTS

Figure 1:
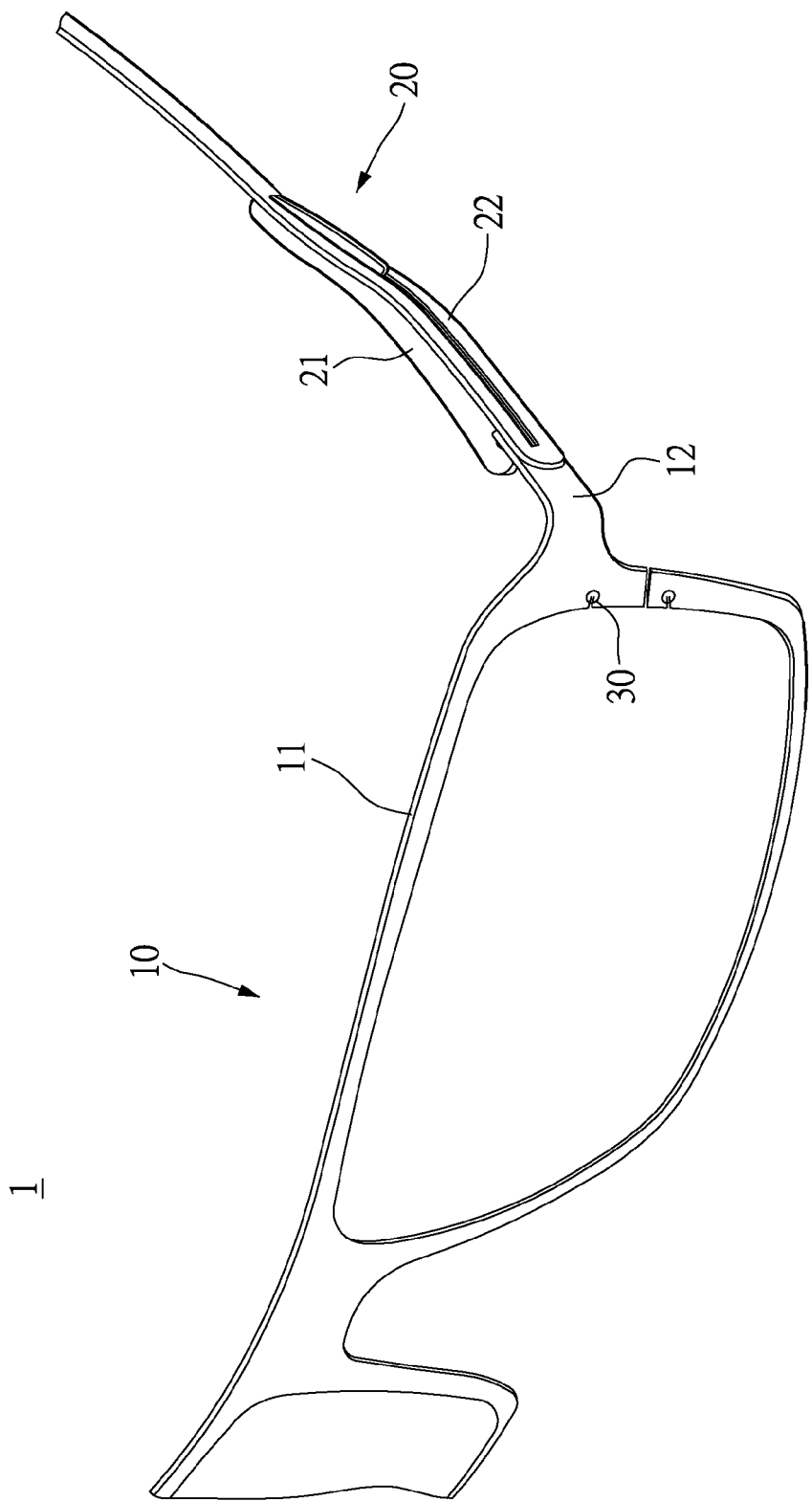
FIG. 1 is an assembled view of a pair of screwless eyeglasses in accordance with the instant disclosure.

FIG. 1 is an assembled view of a pair of screwless eyeglasses in accordance with the instant disclosure. As shown in FIG. 1, the instant disclosure provides a pair of screwless eyeglasses 1 for fitting onto a head of a user. The screwless eyeglasses 1 comprise a frame body 10 and a pair of temple assemblies 20. The frame body 10 is configured in the proximity of the eyes of the user. One end of each temple assembly 20 is retained by an ear of the user. The other end of the temple assembly 20 is coupled to two lateral sides of the frame body 10 through the specific structure to be disclosed hereafter, which replaces the traditional method of securing and assembling parts by screwing or soldering, in order to be environmental friendly and facilitate assembly.

Figure 2:
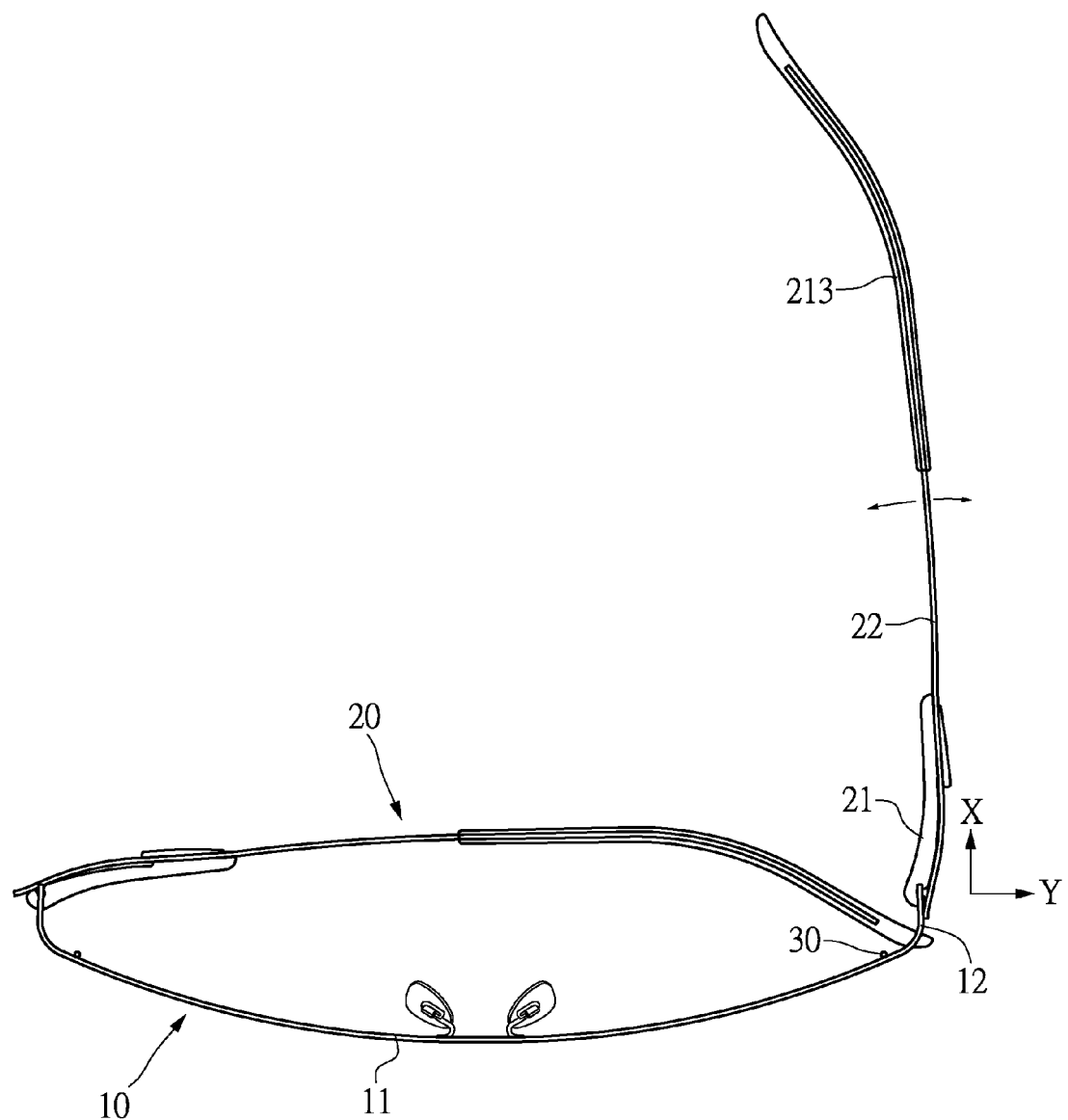
FIG. 2 is a partially assembled view of the pair of screwless eyeglasses in accordance with the instant disclosure.

FIG. 2 is a partially assembled view of the pair of screwless eyeglasses in accordance with the instant disclosure. As shown in FIG. 2, two other ends of the two temple assemblies 20 can be respectively and rotatably coupled to the two lateral sides of the frame body 10 such that the screwless eyeglasses 1 have two modes, a storage mode and a usage mode. The storage mode is defined as the temple assemblies 20 are respectively folded against the frame body 10 to minimize the storage space of the screwless eyeglasses 1 and relatively minimize the probability of the user or others crushing the temple assemblies 20. The usage mode is defined as the frame body 10 and the temple assemblies 20 to be respectively disposed proximate to the eyes and ears of the user.

The frame body 10 includes a rim 11 and a pair of end pieces 12. The end pieces 12 are respectively formed and extended from each of the two lateral sides of the rim 11, the end pieces 12 are substantially normal to the rim 11. The rim 11 can be mounted with a lens (not shown in figures) or used without lenses as an aesthetic accessory.

Figure 3:
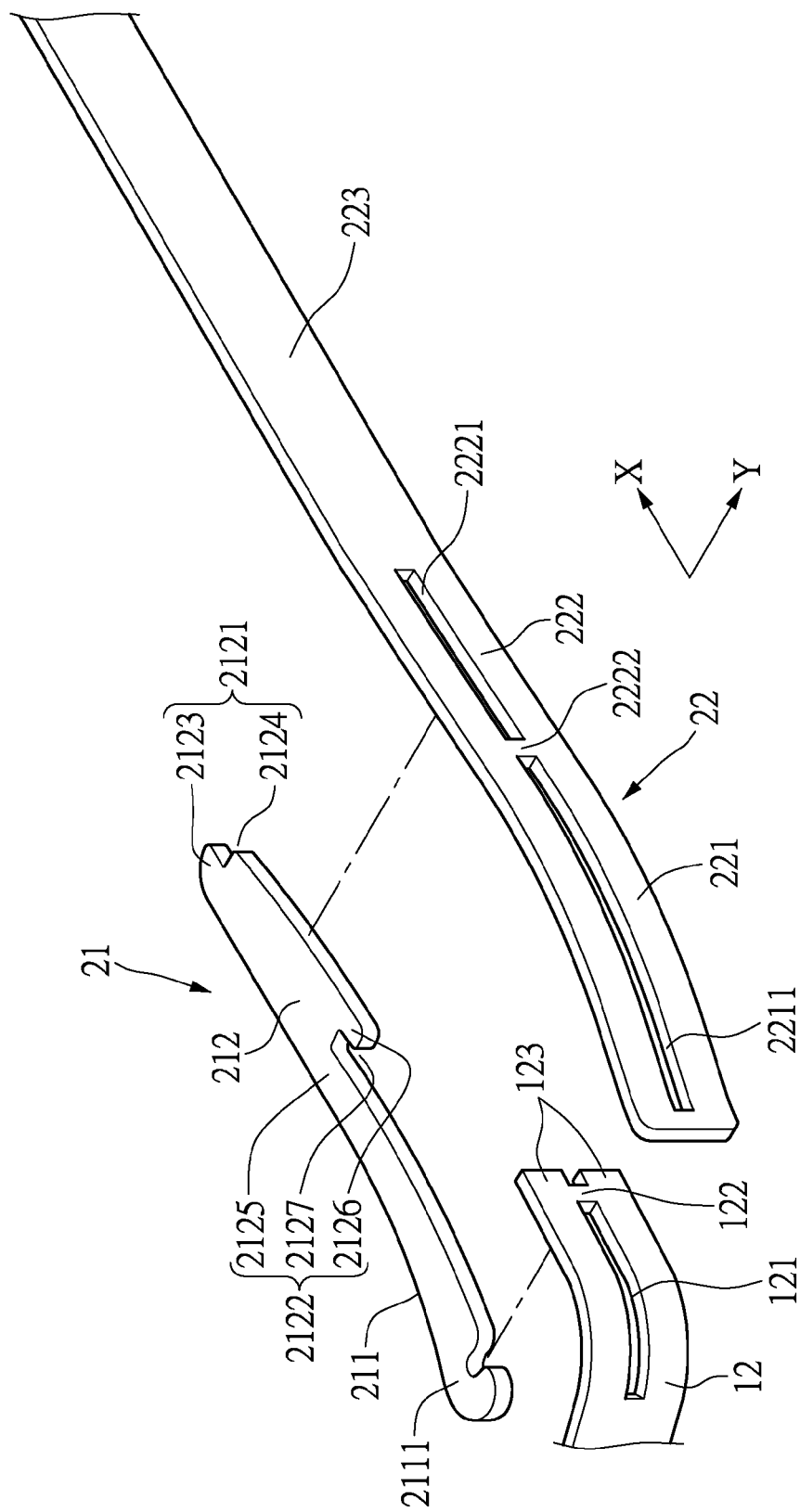
FIG. 3 is a partially exploded view of the pair of screwless eyeglasses in accordance with the instant disclosure.

FIG. 3 is a partially exploded view of the pair of screwless eyeglasses in accordance with the instant disclosure. As shown in FIG. 3, the end portion 12 has an end piece slit 121, an end piece axle 122 and a pair of protrusions 123 arranged thereon. The protrusions 123 are arranged on the free ends of the end portions 12. In other words, the end portion 12 has portions defining the end piece slit 121, and the end piece axle 122 is a portion defined on the end portion 12 thereafter. The end piece axle 122 is arranged adjacent to the end piece slit 121, proximate to the end of the temple assembly 20, and between the end piece slit 121 and the protrusion 123. The pair of protrusions 123 extends from two ends of the end piece axle 122 towards the temple assembly 20.

The temple assembly 20 includes a first connecting member 21 and a second connecting member 22. The first connecting member 21 is configured between the temple of the user and the second connecting member 22. In the instant embodiment, the first connecting member 21 and the second connecting member 22 each is stamped into an individual and flexible piece of sheet metal. The relatively flat surface of the first connecting member 21 is configured normal to the temple of the user, whereas the relatively flat surface of the second connecting member 22 is configured parallel to the temple of the user.

The first connecting member 21 includes a lever arm portion 211 and a latching portion 212. The latching portion 212 is formed by extending from the lever arm portion 211 distal from the frame body 10. One end of the lever arm portion 211 proximate to the frame body 10 is bended to form a hook portion 2111. The hook portion 2111 is bended towards the second connecting member 22. The latching portion 212 has a width relatively larger than a width of the lever arm portion 211. One end of the latching portion 212 distal from the lever arm portion 211 has a first latching portion 2121 arranged thereon. Another end of the latching portion 212 proximate to the lever arm portion 211 has a second latching portion 2122 arranged thereon. In the instant embodiment, the first latching portion 2121 includes a shoulder 2123 extended from the first latching portion 2121 distal from the frame body 10 and a groove 2124. The shoulder 2123 is arranged on a lateral side of the latching portion 212 and has a width relatively smaller than an overall width of the latching portion 212. The groove 2124 is then defined by the shoulder 2123 and has a width substantially equals to a thickness of the second connecting member 22.

The second latching portion 2122 includes an extending portion 2125, a latching shoulder 2126 and a latching slot 2127. The extending portion 2125 of the latching portion 212 is connected to the lever arm portion 211. A width of the extending portion 2125 is substantially the same as the width of the lever arm portion 211. The extending portion 2125 is arranged on the same lateral side as the shoulder 2123. The latching shoulder 2126 is arranged on a lateral side opposite the extending portion 2125, and extends towards the lever arm portion 211. The latching slot 2127 is defined by and between the extending portion 2125 and the latching shoulder 2126 such that the sum of the width of the extending portion 2125 and the width of the latching shoulder 2126 is relatively smaller than the overall width of the latching portion 212. Since the latching slot 2127 is defined between the latching shoulder 2125 and the latching shoulder 2126, a width of the latching slot 2127 is substantially the same as the thickness of the second connecting member 22. The latching slot 2127 of the instant embodiment is oriented towards the end piece 12 of the frame body 10.

The second connecting member 22 includes an elastic portion 221 and an engaging portion 222. The engaging portion 222 extends from the elastic portion 221 distal from the frame body 10. The elastic portion 221 has portions defining a slit 2211. A length of the slit 2211 and a length of the elastic portion 211 are substantially the same, and a width of the slit 2211 and a thickness of the first connecting member are substantially the same. The engaging portion 222 has portions defining an engaging slit 2221. A width of the engaging slit 2221 is substantially the same as the thickness of the first connecting member 21. The portions defining the engaging slit 2221 and the slit 2211 is the engaging axle 2222. In the instant embodiment, the second connecting member also includes an earpiece 223. The earpiece 223 extends from the engaging portion 222 distal from the frame body 10.

Figure 4:
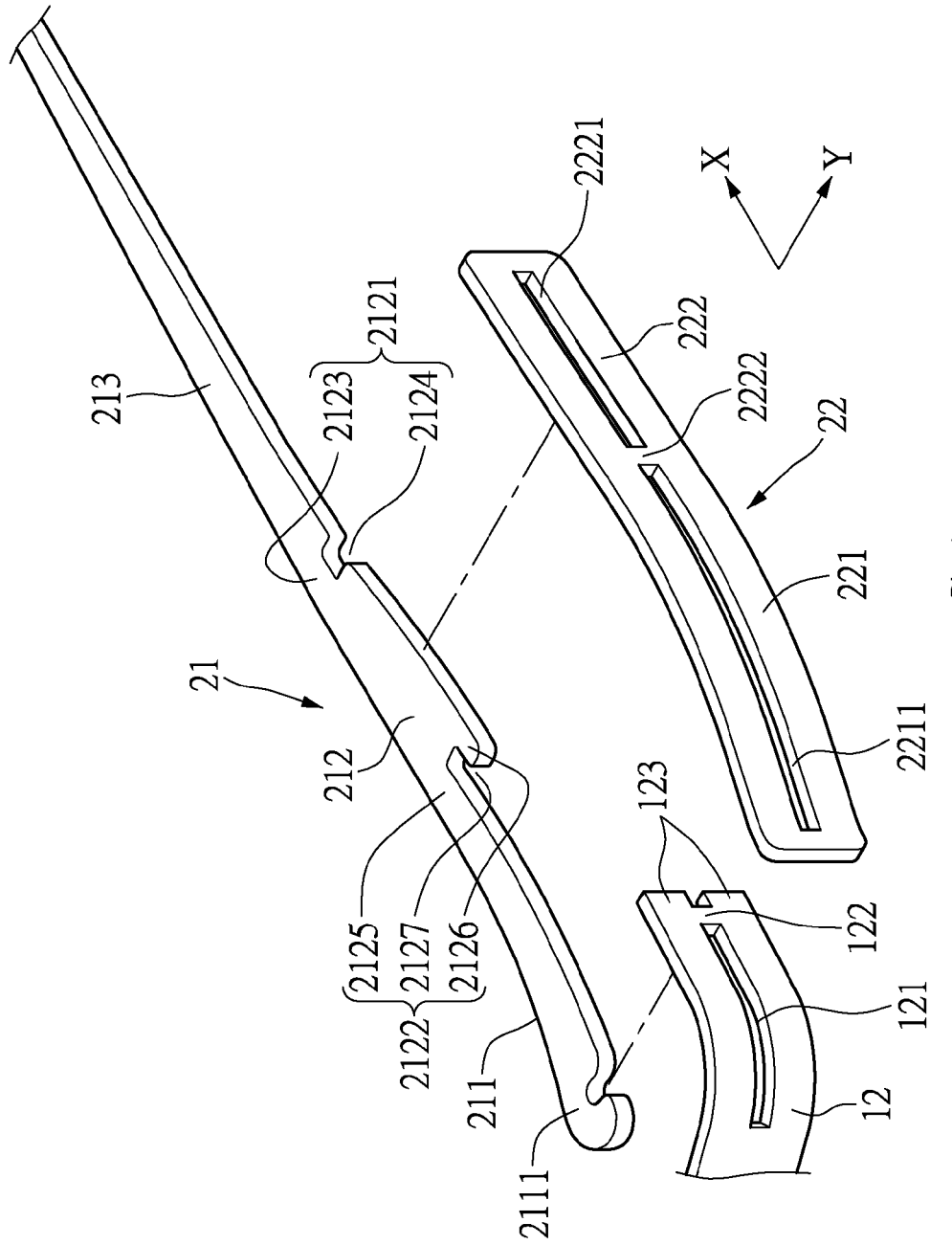
FIG. 4 is another partially exploded view of the pair of screwless eyeglasses in accordance with the instant disclosure.

FIG. 4 is another partially exploded view of the pair of screwless eyeglasses in accordance with the instant disclosure. In another embodiment of the instant disclosure, the first connecting member further includes an earpiece 213. The earpiece 213 extends from the latching portion 212 distal from the frame body 10.

Figure 5:
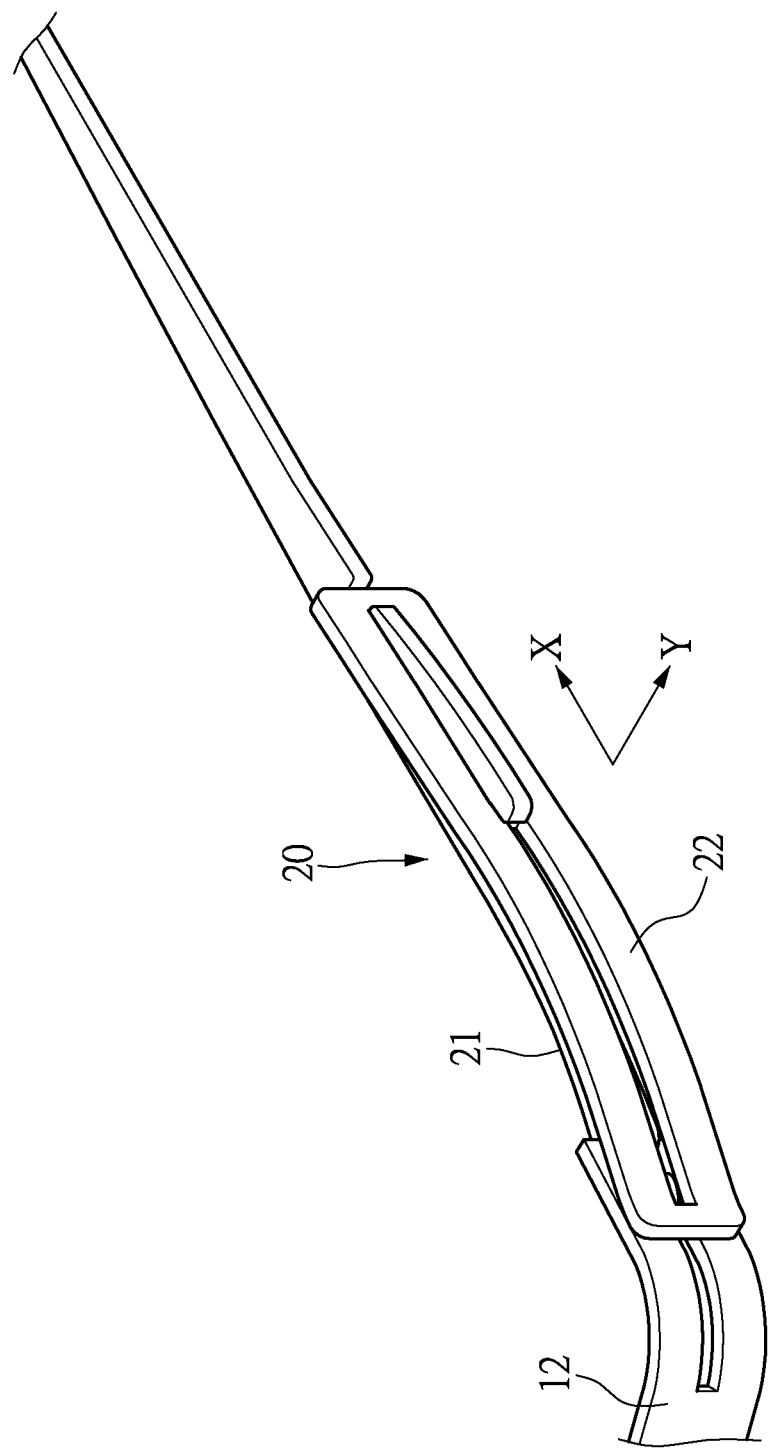
FIG. 5 is a schematic diagram illustrating the operations of the pair of screwless eyeglasses in accordance with the instant disclosure.

FIG. 5 is a schematic diagram illustrating the operations of the pair of screwless eyeglasses in accordance with the instant disclosure. As shown in FIGS. 2, 3, and 5, the lengthwise direction of the temple assembly 20 in the unfolded state is defined as an X-axis of the Cartesian coordinate system, whereas a Y-axis is defined as normal to the X-axis and substantially parallel with the rim 11. The latching portion 212 is fitted through the engaging slit 2221. The first engaging portion 2121 and the second engaging portion 2122 respectively latch to two end portions of the engaging portion 222. The end portion of the engaging portion 222 distal from the frame body 10 is fitted in the groove 2124. In other words, the shoulder 2123 abuts the end portion of the engaging portion 222 distal from the frame body 10 to restrain displacements between the first connecting member 21 and the second connecting member 22 along the Y-axis. The engaging slot 2221 has a slot wall distal from the frame body 10 and the groove 2124 has a groove wall proximate to the frame body 10. The slot wall and the groove wall mutually abut to restrains displacements between the first connecting member 21 and the second connecting member 22 along the X-axis. The end portion of the engaging portion 222 proximate to the frame body 10 (namely the engaging axle 2222) is fitted in the latching slot 2127. The engaging slot 2221 has another slot wall proximate to the frame body 10, and the latching slot 2127 has a slot wall proximate to the frame body 10. The extending portion 2125 and the latching shoulder 2126 flank the engaging axle 2222, such that the other slot wall of the engaging slot 2221 proximate to the frame body 10 and the slot wall of the latching slot 2127 proximate to the frame body 10 mutually abut. In other words, the engaging axle 2222 is fitted in the latching slot 2127 to restrain displacements between the first connecting member 21 and the second connecting member 22 along the X-axis. The extending portion 2125 and the latching shoulder 2126 restrains displacements between the first connecting member 21 and the second connecting member 22 along the Y-axis.

In the instant embodiment, a length of the latching portion 212 is relatively larger than a length of the engaging slot 2221. When assembling the first connecting member 21 with the second connecting member 22, the lever arm portion 211 is fitted through the slit 2211 such that the end portion of the engaging portion 222 proximate to the frame body 10 can smoothly fit in the latching slot 2127. The shoulder 2123 abuts the other end portion of the engaging portion 222. As shown in FIGS. 2, 3, and 5, the hook portion 2111 of the lever arm portion 211 is fitted through the end piece slit 121 and latched to the end piece axle 122. The end piece axle 122 is configured between the hook portion 2111 and the elastic portion 221. In other words, the protrusions 123 are configured on two sides of the lever arm portion 123 and abut the elastic portion 221. When the end piece axle 122 pushes apart the lever arm portion 211 and the elastic portion 221, the engaging portion 222 abuts the latching shoulder 2126. The elastic portion 221 is pushed apart from the lever arm portion 211 through the engaging portion 222 as a fulcrum and the lever arm portion 211 is pushed apart from the elastic portion 221 through the latching portion 212 as a fulcrum. Since the first connecting member and second connecting member 21, 22 are made of flexible materials, when the end piece axle 122 is latched in the hook portion 2111, the lever arm portion 211 and the elastic portion 221 mutually applied compression forces against each other, and thusly, the end piece axle 122 can be clamped between the lever arm portion 211 and the elastic portion 221. With the structural configuration of the instant disclosure, the temple assembly 20 has a certain degree of movements such that the screwless eyeglasses 1 of the instant disclosure are not limited to various sizes of human heads.

Figure 6:
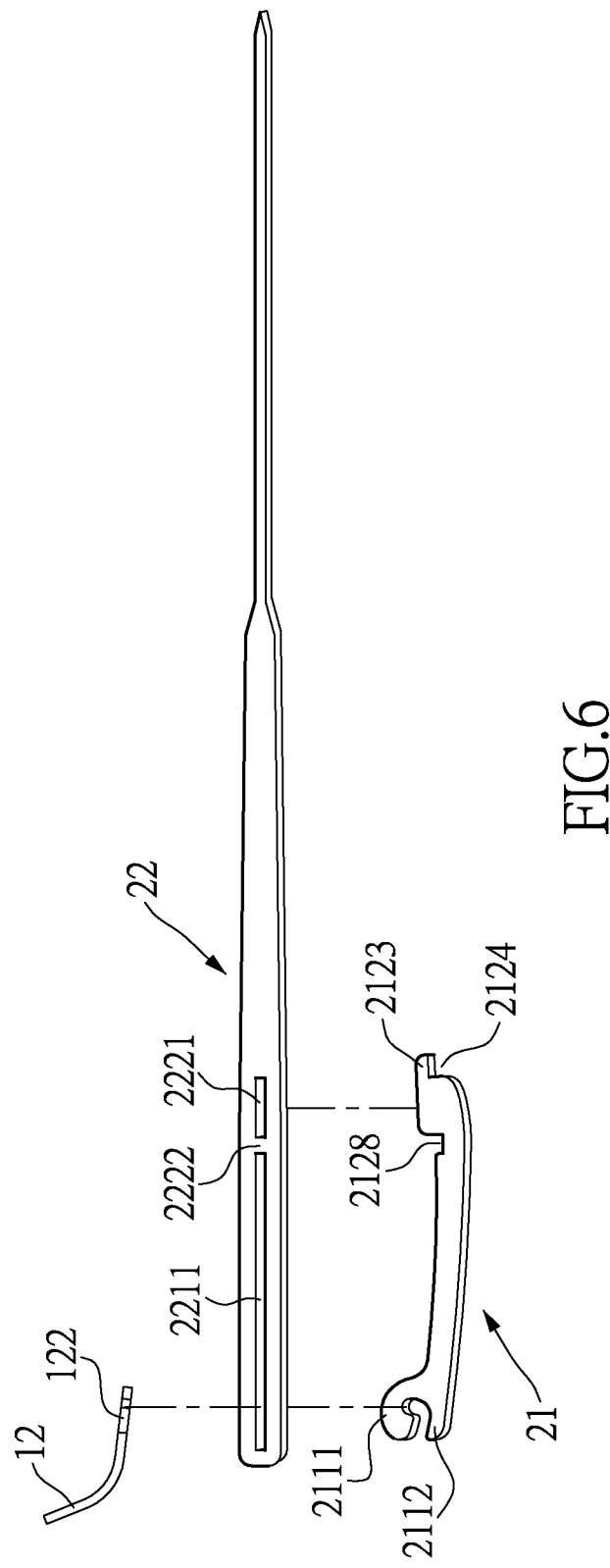
FIG. 6 is another partially exploded view of the pair of screwless eyeglasses in accordance with the instant disclosure.
Figure 7:
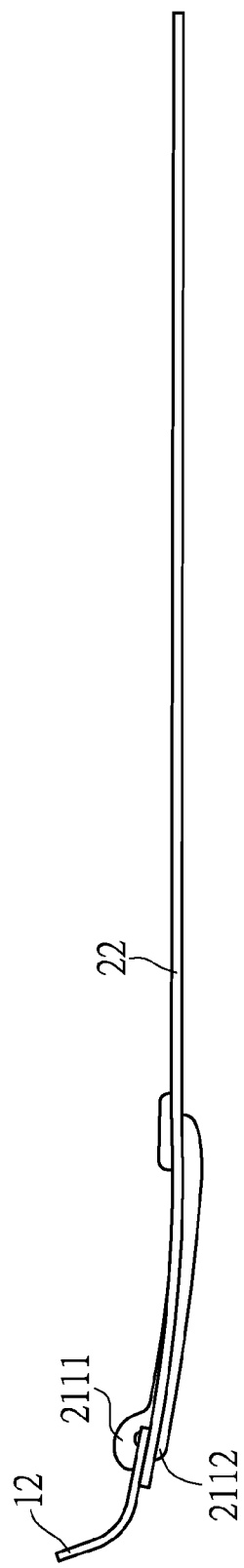
FIG. 7 is another schematic diagram illustrating the operations of the pair of screwless eyeglasses in accordance with the instant disclosure.

FIG. 6 is another partially exploded view of the pair of screwless eyeglasses for another embodiment in accordance with the instant disclosure. FIG. 7 is another schematic diagram illustrating the operations of the pair of screwless eyeglasses for another embodiment in accordance with the instant disclosure. As shown in FIGS. 6 and 7, one end of the lever arm portion 211 proximate to the frame body 10 extends to form a tab 2112. The tab 2112 and the hook portion 2111 are arranged side by side. When the end piece axle 122 latches the hook portion 2111, the tab 2112 is fitted through the slit 2211 and abuts portions of the end piece axle 122 to restrain displacements between the first connecting member 21 and the end pieces 12. The end piece axle 122 can be a cylinder or round shaft (not shown in figures) such that the hook portion 2111 can smoothly rotate about the end piece axle 122.

Please refer to FIG. 6. In the instant embodiment of the instant disclosure, the second latching portion 2122 has portions defining a slot 2128. One end portion of the engaging portion 222 proximate to the frame body 10 is fitted in the slot 2128, in other words, the engaging axle 2222 is fitted in the slot 2128.

As shown in FIGS. 2 and 3, when the screwless eyeglasses 1 are in the usage mode, the end piece 12 is coupled to the second connecting member 22, in other words, an angle between the protrusions 123 of the end piece 12 and the second connecting member 22 is 0°. As aforementioned, the end piece axle 122 pushes the lever arm portion 211 and the elastic portion 221 by a distance apart. The distance is substantially the same as a thickness of the end piece 12. When the screwless eyeglasses 1 is in the storage mode, a pre-determined angle between the protrusions 123 of the end piece 12 and the second connecting member 22 is larger than 90°. The protrusion 123 presses against the second connecting member 22 such that the distance between the lever arm portion 211 and the elastic portion 221 is even larger than aforementioned. When the screwless eyeglasses 1 transitions from the usage mode to the storage mode, the angle between the protrusions 123 of the end piece 12 and the second connecting member 22 transitions from 0° to the pre-determined angle as mentioned above. Moreover, the contact area and the friction vary between the end piece 12 and the second connecting member 22. The forces applied by the lever arm portion 211 and the elastic portion 221 onto the end piece 12 become larger such that the protrusion 123 of the screwless eyeglasses 1 maintains at a non-slip state during the usage and storage mode. When the screwless eyeglasses 1 are not in usage nor storage mode, substantial slippage emerges between the protrusion 123 and the second connecting member 22 to provide transitioning between the usage mode and the storage mode. The aforementioned structural configuration replaces the elastic functionality of the traditional spring, which minimizes the pressure a wearer might feel, facilitates storage of the screwless eyeglasses 1, and minimizes the possibility of the temple assembly 20 from being bended.

Figure 8:
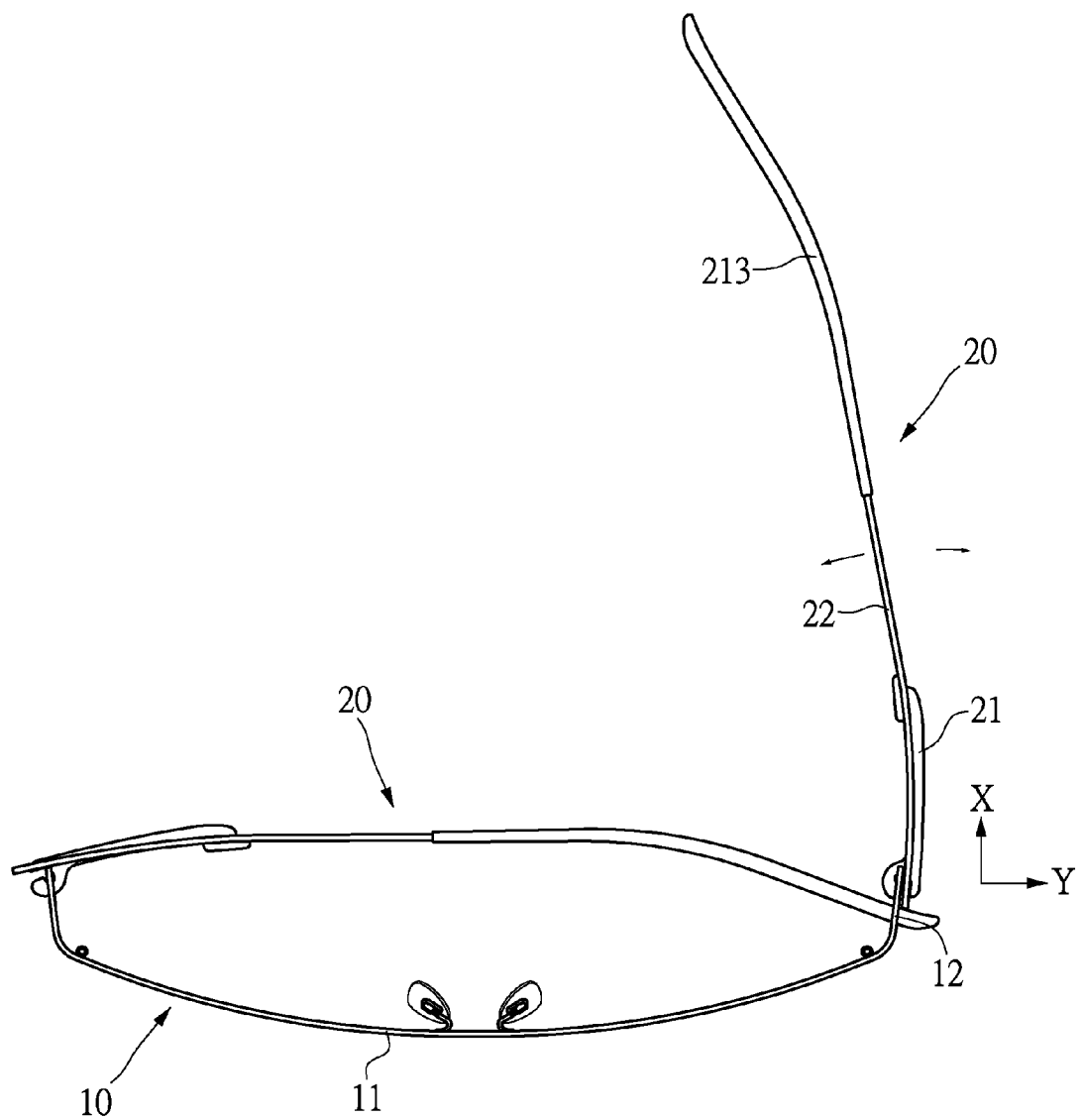
FIG. 8 is another partially assembled view of the pair of screwless eyeglasses in accordance with the instant disclosure.

FIG. 8 is another partially assembled view of the pair of screwless eyeglasses in accordance with the instant disclosure. As shown in FIGS. 6, 7, and 8, when the screwless eyeglasses 1 are in the usage mode, the tab 2112 presses against an end of the elastic portion 221 proximate to the frame body 10. The slot 2128 is fitted with the engaging axle 2222 of the engaging portion 222. Thus, the slot 2128 restrains displacements between the first connecting member 21 and the second connecting member 22 along the X-axis, and the tab 2112 restrains displacements between the first connecting member 21 and the end piece 12 along the Y-axis.

FIGS. 9A and 10A are front views illustrating the rim of the pair of screwless eyeglasses in accordance with another embodiment of the instant disclosure, and FIGS. 9B and 10B are side views illustrating the rim of the pair of screwless eyeglasses in accordance with the instant disclosure. As shown in FIG. 10A, the screwless eyeglasses 1 of the instant disclosure further include a fixing member 30. Two ends of the fixing member 30 each has portions defining a coupling portion 31, and portions of the fixing member 30 between the two coupling portion 31 is defined as a fixing body 32. In the instant embodiment, the fixing body 32 is a spring or can be an elastic body.

As shown in FIGS. 9A and 9B, the first rim 111 and second rim 112 of the rim 11 each has portions defining two notches 1112, 1122. The two notches 1112, 1122 are slantingly arranged proximate to two lateral sides of the first rim 111 and second rim 112, respectively. Moreover, each notch 1112, 1122 outwardly slants from inside the rim 11 converging towards the contact point of the first rim 111 and the second rim 112. In other words, the notches 1112, 1122 gradually and outwardly slants towards each other.

As shown in FIGS. 10A and 10B, the fixing member 30 is coupled through the notches 1112, 1122 such that the two coupling portions 31 at two ends of the fixing member 30 respectively press against the first rim 111 and the second rim 112 by forces generated in the fixing body 32 when stretched. The first rim 111 and the second rim 112 are flexibly fixed to each other through the elasticity of the fixing body 32. Furthermore, through the slanted arrangement of the notches 1112, 1122, the fixing member 30 cannot effortlessly slide out of the notches 1112, 1122. To install lenses in the rim 11, lenses are fixed in the rim 11 through forces generated by compression of the fixing body 32. With the aforementioned lenses installation, excessive pressure to fix lenses in the rim 11 can be minimized such that the usable life of the lenses is maximized without the use of screws.

In summary, the instant disclosure provides the following enhancements. With the configuration of the first latching portion 2121 and the second latching portion 2122 restrain displacements between the first connecting member 21 and the second connecting member 22. The configuration of the hook portion 2111 and the end piece axle 122 facilitate the connection between the temple assembly 20 and the frame body 10, thus, providing mutually tighter coupling between the first connecting member 21 and the second connecting member 22. With the configuration of the protrusions 123, the screwless eyeglasses 1 can easily be in the usage or storage mode such that the probability of the temple assembly 20 being crushed and the pressure felt by the wearer of the eyeglasses are minimized. Furthermore, with the configuration between the fixing member 30 and notches 1112, 1122, lenses can be securely installed in the rim 11 without the use of screws.

The figures and descriptions supra set forth illustrated the preferred embodiments of the instant disclosure; however, the characteristics of the instant disclosure are by no means restricted thereto. All changes, alternations, combinations or modifications conveniently considered by those skilled in the art are deemed to be encompassed within the scope of the instant disclosure delineated by the following claims.

What is claimed is:

1. A temple assembly of a pair of screwless eyeglasses connected to a frame body, comprising:
   a first connecting member comprising a lever arm portion and a latching portion extended from the lever arm portion and distal from the frame body; and
   a second connecting member having an elastic portion and an engaging portion extended from the elastic portion and distal from the frame body;
   wherein the latching portion is detachably coupled to the engaging portion, and the elastic portion flexes toward the lever arm portion through the engaging portion as a fulcrum;
      wherein the latching portion is formed with a first latching portion distal from the lever arm portion and a second latching portion proximate to the lever arm portion, the engaging portion has portions defining an engaging slit, the latching portion is fitted through the engaging slit, and the first latching portion and the second latching portion respectively latch on to two end portions of the engaging portion;
   wherein the frame body having an end piece is rotatably coupled between the elastic portion and the lever arm portion.

2. The temple assembly of the pair of screwless eyeglasses as recited in claim 1, wherein an end portion of the lever arm portion proximate to the frame body oriented towards the elastic portion has a hook portion formed at the end portion.

3. The temple assembly of the pair of screwless eyeglasses as recited in claim 2, wherein the end portion of the lever arm portion proximate to the frame body also has a tab formed on the end portion, and the tab presses against the end piece.

4. The temple assembly of the pair of screwless eyeglasses as recited in claim 1, wherein the latching portion extends towards the second connecting member and has a width larger than a width of the lever arm portion, the first latching portion includes a shoulder and a groove defined by the shoulder, and the second latching portion includes an extending portion, a latching shoulder, and a latching slot defined by the extending portion and the latching shoulder.

5. The temple assembly of the pair of screwless eyeglasses as recited in claim 1, wherein the second latching portion has portions forming a slot, and one end portion of the engaging portion proximate to the elastic portion is formed with an engaging axle coupled to the slot.

6. The temple assembly of the pair of screwless eyeglasses as recited in claim 1, wherein the first connecting member further comprises:
   an earpiece extended from the latching portion and distal from the lever arm portion, and the earpiece being retained on an ear of an user.

7. The temple assembly of the pair of screwless eyeglasses as recited in claim 1, wherein the first connecting member is configured between the temple of the user and the second connecting member.

8. The temple assembly of the pair of screwless eyeglasses as recited in claim 1, wherein the second connecting member is retained proximate to the temple of the user and configured substantially in parallel with the first connecting member.

9. The temple assembly of the pair of screwless eyeglasses as recited in claim 1, wherein the elastic portion has portions defining a slit, and the lever arm portion of the first connecting member is detachably coupled to the slit.

10. The temple assembly of the pair of screwless eyeglasses as recited in claim 1, wherein the second connecting member further comprises:
    an earpiece extended from the engaging portion and distal from the lever arm portion, and the earpiece being retained on an ear of an user.

11. A pair of screwless eyeglasses, comprising:
    a frame body comprising a rim and a pair of end pieces extended from two lateral sides of the rim; and
    two temple assemblies respectively connected to the two end pieces of the frame body, wherein each of the two temple assemblies comprises:
        a first connecting member comprising a lever arm portion and a latching portion extended from the lever arm portion and distal from the frame body; and
        a second connecting member having an elastic portion and an engaging portion extended from the elastic portion and distal from the frame body;
        wherein the latching portion is detachably coupled to the engaging portion, and the elastic portion flexibly flexes toward the lever arm portion through the engaging portion as a fulcrum;
            wherein the latching portion is formed with a first latching portion distal from the lever arm portion and a second latching portion proximate to the lever arm portion, the engaging portion has portions defining an engaging slit, the latching portion is fitted through the engaging slit, and the first latching portion and the second latching portion respectively latch on to two end portions of the engaging portion;
    wherein the two end pieces of the frame body are respectively rotatably coupled between the elastic portions and the lever arm portions of the two temple assemblies.

* * * * *